United States Patent
Hsu

(10) Patent No.: US 8,989,481 B2
(45) Date of Patent: Mar. 24, 2015

(54) STEREO MATCHING DEVICE AND METHOD FOR DETERMINING CONCAVE BLOCK AND CONVEX BLOCK

(75) Inventor: Hung-Min Hsu, Tainan (TW)

(73) Assignee: Himax Technologies Limited, Tainan (TW)

( * ) Notice: Subject to any disclaimer, the term of this patent is extended or adjusted under 35 U.S.C. 154(b) by 93 days.

(21) Appl. No.: 13/371,659

(22) Filed: Feb. 13, 2012

(65) Prior Publication Data

US 2013/0208975 A1 Aug. 15, 2013

(51) Int. Cl.
*G06F 9/00* (2006.01)
*G06T 7/00* (2006.01)

(52) U.S. Cl.
CPC ..... *G06T 7/0075* (2013.01); *G06T 2207/10012* (2013.01)
USPC .......................................... 382/154; 382/291

(58) Field of Classification Search
None
See application file for complete search history.

(56) References Cited

U.S. PATENT DOCUMENTS

| | | | |
|---|---|---|---|
| 5,179,441 A * | 1/1993 | Anderson et al. | 348/43 |
| 5,202,928 A * | 4/1993 | Tomita et al. | 382/154 |
| 5,487,116 A * | 1/1996 | Nakano et al. | 382/104 |
| 6,011,863 A * | 1/2000 | Roy | 382/154 |
| 7,092,015 B1 | 8/2006 | Sogawa | |
| 7,227,526 B2 * | 6/2007 | Hildreth et al. | 345/156 |
| 7,272,256 B2 | 9/2007 | Zhang et al. | |
| 8,120,648 B2 | 2/2012 | Liu et al. | |
| 2003/0204384 A1 * | 10/2003 | Owechko et al. | 703/1 |
| 2003/0231792 A1 * | 12/2003 | Zhang et al. | 382/154 |
| 2004/0228521 A1 * | 11/2004 | Jeong et al. | 382/154 |
| 2005/0063582 A1 * | 3/2005 | Park et al. | 382/154 |
| 2006/0029272 A1 * | 2/2006 | Ogawa | 382/154 |

(Continued)

FOREIGN PATENT DOCUMENTS

| | | |
|---|---|---|
| TW | I278225 | 4/2007 |
| TW | I331872 | 10/2010 |

(Continued)

OTHER PUBLICATIONS

Donghyun Kim, Dongo Min, Kwanghoon Sohn. "A Stereocopic Video Generation Method using Stereoscophic Display Characterization and Motion Anyalsis" IEEE, vol. 54, No. 2. Jun. 2008.*

(Continued)

*Primary Examiner* — Jon Chang
*Assistant Examiner* — Oneal R Mistry
(74) *Attorney, Agent, or Firm* — McClure, Qualey & Rodack, LLP

(57) ABSTRACT

A stereo matching device used in a stereoscopic display system for determining a concave block and a convex block is provided. The stereo matching device comprises a receiving module for receiving a first and a second view-angle frames, a computation module, a feature extraction module and an estimation module. The computation module generates a disparity map having disparity entries respectively corresponding to blocks of the first view-angle frame. The feature extraction module generates feature maps each having feature entries respectively corresponding to the blocks. The estimation module comprises a reliability computation unit for computing a feature reliability of each of the blocks based on the feature maps and a comparator unit for filtering out unqualified blocks according to at least one reliability threshold to generate a plurality of candidate blocks and further determining the concave block and the convex block.

7 Claims, 5 Drawing Sheets

(56) References Cited

U.S. PATENT DOCUMENTS

| | | | |
|---|---|---|---|
| 2008/0219505 A1* | 9/2008 | Morimitsu | 382/103 |
| 2009/0109127 A1 | 4/2009 | Chang et al. | |
| 2010/0195898 A1* | 8/2010 | Bang et al. | 382/154 |
| 2010/0220920 A1* | 9/2010 | Barenbrug | 382/154 |
| 2010/0328427 A1* | 12/2010 | Sakano et al. | 348/43 |
| 2011/0025827 A1 | 2/2011 | Shpunt et al. | |
| 2011/0158528 A1* | 6/2011 | Yea et al. | 382/170 |
| 2011/0311147 A1* | 12/2011 | Pahalawatta et al. | 382/197 |
| 2012/0026295 A1* | 2/2012 | Nishimura et al. | 348/46 |
| 2012/0033051 A1* | 2/2012 | Atanassov et al. | 348/49 |
| 2012/0045119 A1* | 2/2012 | Schamp | 382/157 |
| 2012/0063669 A1* | 3/2012 | Hong et al. | 382/154 |
| 2012/0084652 A1* | 4/2012 | Martinez Bauza et al. | 715/719 |
| 2012/0224032 A1* | 9/2012 | Takiguchi | 348/47 |
| 2012/0249750 A1* | 10/2012 | Izzat et al. | 348/47 |
| 2012/0314937 A1* | 12/2012 | Kim et al. | 382/154 |
| 2013/0095920 A1* | 4/2013 | Patiejunas et al. | 463/31 |

FOREIGN PATENT DOCUMENTS

| | | |
|---|---|---|
| TW | 201112161 | 4/2011 |
| TW | I357987 | 2/2012 |

OTHER PUBLICATIONS

Donghym Kim, Kwanghoon Sohn. "Depth adjustment for Stereoscopic image using visual fatigue prediction and depth-based view synthesis" IEEE, ISBN: 978-1-4244-7493-6-10. 2010.*

William Hoff, Narendra Ahuja. "Surface from Stereo: Integrating Feature Matching, Disparity Estimation, and Contour Detection" IEEE, vol. 11 No. 2 . Feb. 1989.*

Hajar Sadeghi, Payman Moallem, S. Amirhassn Monadjemi. "Feature Based Dense Stereo Matching using Dynamic Programming and Color" World Academy of Science, vol. 18. 2008.*

Bo Tang, Djamel Ait-Boudaoud, Bogdan Matuszewski, Lik-kwan Shark. "An Efficicent Feature Based Matching Algorithm for Stereo Images" IEEE, 0-7695-2604-7/06. 2006.*

* cited by examiner

STEREO MATCHING DEVICE AND METHOD FOR DETERMINING CONCAVE BLOCK AND CONVEX BLOCK

BACKGROUND

1. Technical Field

The present disclosure relates to a display technology. More particularly, the present disclosure relates to a stereo matching device and a stereo matching method used in a stereoscopic display system for determining a concave block and a convex block.

2. Description of Related Art

Stereo matching of images is widely employed as one method of automatically generating three-dimensional data from stereo images. A stereo matching process is for finding matching points, at which the same position is picked up, from two images or so-called stereo images that are captured from different viewpoints, and calculating the depth to an object of interest or its shape according to the principle of triangulation by using the disparity between the matching points.

By using stereo matching, there are two important parameters to estimate, i.e. the concave and the convex. Some technologies use global search method to perform stereo matching process such as graph cut or belief propagation. However, the cost of these methods is extremely high in terms of run time or hardware complexity. Further, the reliability of these methods is not good enough as well.

Accordingly, it is desired to provided a stereo matching device and a stereo matching method used in a stereoscopic display system for determining the concave block and the convex block to overcome the above issues. The present disclosure addresses such a need.

SUMMARY

An aspect of the present disclosure is to provide a stereo matching device used in a stereoscopic display system for determining a concave block and a convex block. The stereo matching device comprises a receiving module, a computation module, a feature extraction module and an estimation module. The receiving module receives a first view-angle frame and a second view-angle frame and divides the first view-angle frame into a plurality of blocks. The computation module generates a disparity map having a plurality of disparity entries respectively corresponding to the plurality of blocks according to the first view-angle frame and the second view-angle frame. The feature extraction module performs a feature extraction process on each of the blocks to generate a plurality of feature maps, wherein each of the feature maps has a plurality of feature entries respectively corresponding to the blocks. The estimation module comprises a reliability computation unit and a comparator unit. The reliability computation unit computes a feature reliability of each of the blocks based on the plurality of feature maps, wherein the feature reliability is a sum of the feature entries of the feature maps. The comparator unit filters out a plurality of unqualified blocks according to a comparison result between the feature reliability of each of the blocks and at least one reliability threshold to generate a plurality of candidate blocks and further determining the concave block and the convex block according to a maximum disparity entry and a minimum disparity entry of the candidate blocks.

Another aspect of the present disclosure is to provide a stereo matching method used in a stereo matching device of a stereoscopic display system for determining a concave block and a convex block. The stereo matching method comprises the steps outlined below. A first view-angle frame and a second view-angle frame are received. The first view-angle frame is divided into a plurality of blocks. A disparity map having a plurality of disparity entries respectively is generated corresponding to the plurality of the blocks according to the first view-angle frame and the second view-angle frame. A feature extraction process is performed on each of the blocks to generate a plurality of feature maps, wherein each of the feature maps has a plurality of feature entries respectively corresponding to the blocks. A feature reliability of each of the blocks is computed based on the plurality of the feature maps, wherein the feature reliability is a sum of the feature entries of the feature maps. A plurality of unqualified blocks are filtered out according to a comparison result between the feature reliability of each of the blocks and at least one reliability threshold to generate a plurality of candidate blocks. The concave block and the convex block are determined according to a maximum disparity entry and a minimum disparity entry the candidate blocks.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
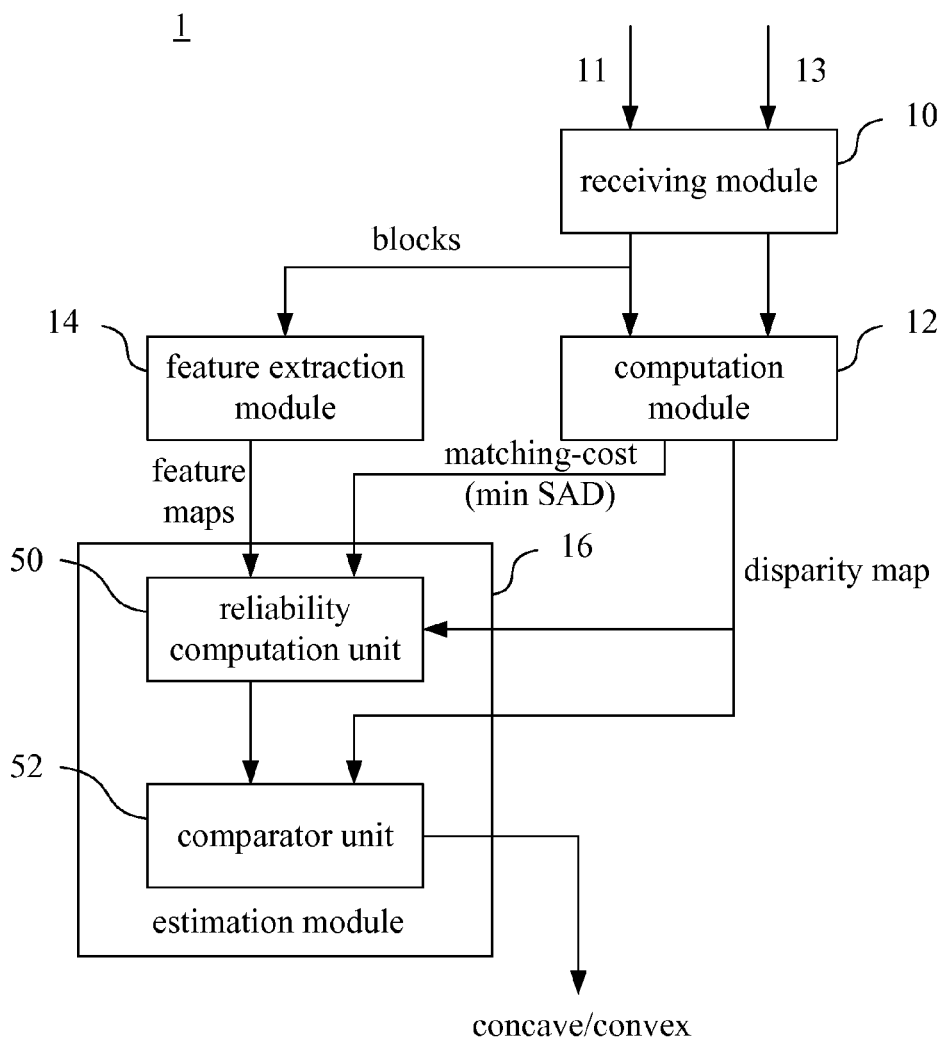
FIG. 1 is a block diagram of a stereo matching device for determining a concave block and a convex block in an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a block diagram of a stereo matching device 1 used in a stereoscopic display system (not shown) for determining a concave block and a convex block in an embodiment of the present disclosure. The stereo matching device 1 comprises a receiving module 10, a computation module 12, a feature extraction module 14 and an estimation module 16.

Figure 2:
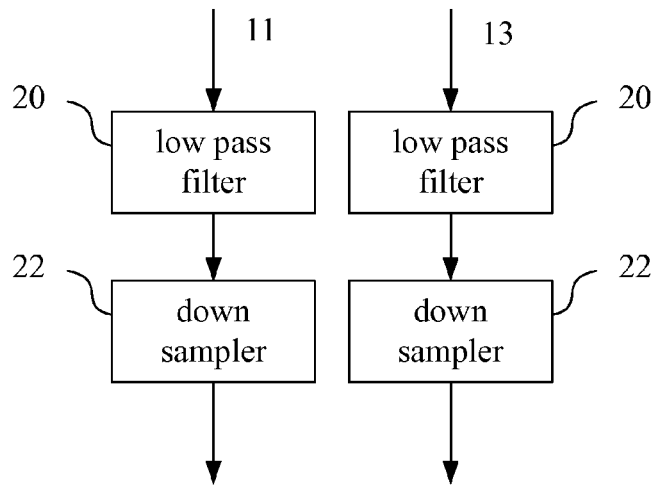
FIG. 2 is a detailed block diagram of a receiving module in an embodiment of the present disclosure.

FIG. 2 is a detailed block diagram of the receiving module 10 in an embodiment of the present disclosure. The receiving module 10 receives a first view-angle frame 11 and a second view-angle frame 13. In an embodiment, one of the first view-angle frame 11 and the second view-angle frame 13 is a left view-angle frame and the other is a right view-angle frame, in which the left view-angle frame is for being perceived by the left eye of an observer and the right view-angle frame is for being perceived by the right eye of the observer. In the present embodiment, the receiving module 10 comprises low pass filters 20 and a down sampler 22 to perform a low pass filtering process and a down sampling process on the first view-angle frame 11 and the second view-angle frame 13 respectively. The receiving module 10 further divides the first view-angle frame 11 (or the second view-angle frame 13) into a plurality of blocks. In an embodiment, each of the blocks has the same size and comprises a plurality of pixels. For example, the first view-angle frame 11 can be divided into the blocks each having a size of 5 pixels×5 pixels. In other embodiments, the first view-angle frame 11 can be divided in the blocks having different sizes as well. In other embodiment, the receiving module 10 may further divides the first view-angle frame 11 into a plurality of objects by a segmentation method which segment each object in the first view-angle frame 11 according to color or edge information in the first view-angle frame 11.

Figure 3:
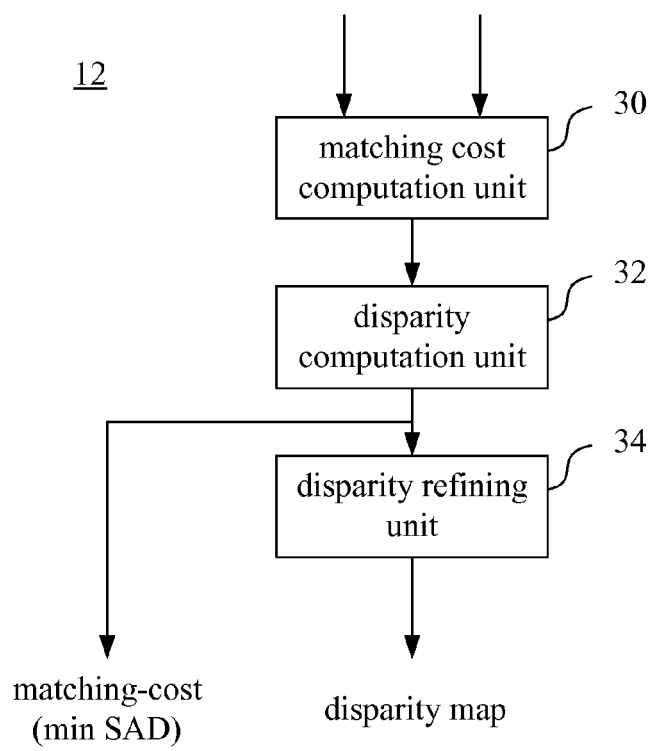
FIG. 3 is a detailed block diagram of a computation module in an embodiment of the present disclosure.

The computation module 12 generates a disparity map having a plurality of disparity entries respectively corresponding to the plurality of blocks (or objects) according to the first view-angle frame 11 and the second view-angle frame 13. FIG. 3 is a detailed block diagram of the computation module 12 in an embodiment of the present disclosure. The computation module 12 comprises a matching cost computation unit 30, a disparity computation unit 32 and a disparity refining unit 34. In an embodiment, the computation module 12 computes a minimal sum of absolute difference (SAD), named matching-cost hereafter, between each of the blocks of the first view-angle frame 11 and each of a plurality of corresponding blocks of the second view-angle frame 13 by the matching cost computation unit 30 first. The SAD computation technique is one of the simplest of the similarity measures that is calculated by subtracting pixels within a square neighborhood between the reference image (the first view-angle frame 11) and the target image (the second view-angle frame 13) followed by the aggregation of absolute differences within the square window.

Further, the disparity computation unit 32 selects the minimum of the SAD. The minimum of SAD can be used to find the matched block (or object). If the left and right images exactly match, the resultant will be zero. The disparity refining unit 34 provides a further refining mechanism to generate the disparity map, in which the refining mechanism can be implemented with various conventional methods. Accordingly, the depth information of the images can be derived from the computation of the disparity map.

Figure 4:
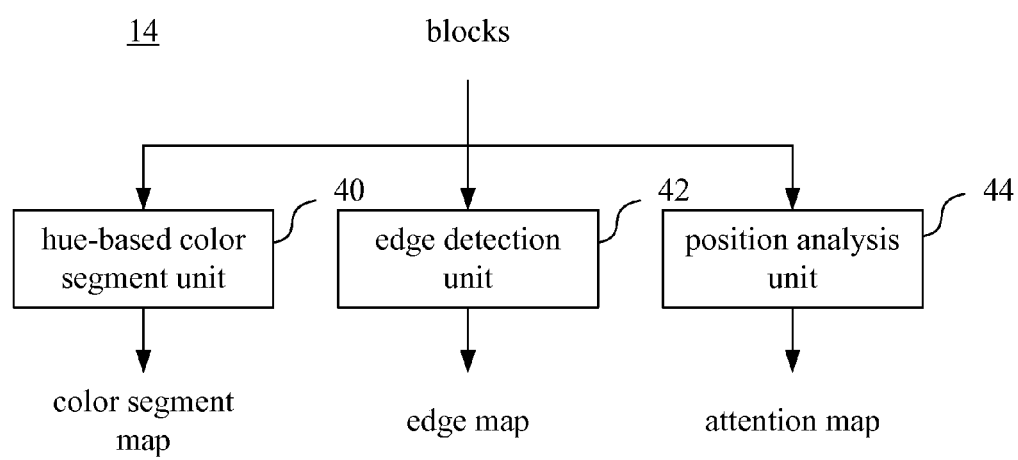
FIG. 4 is a detailed block diagram of a feature extraction module in an embodiment of the present disclosure.

FIG. 4 is a detailed block diagram of the feature extraction module 14 in an embodiment of the present disclosure. The feature extraction module 14 receives the blocks of the first view-angle frame 11 divided by the receiving module 10 and performs a feature extraction process on each of the blocks to generate a plurality of feature maps, wherein each of the feature maps has a plurality of feature entries respectively corresponding to the blocks. In the present embodiment, the feature extraction module 14 comprises a hue-based color segment unit 40, an edge detection unit 42 and a position analysis unit 44. The hue-based color segment unit 40 generates a color segment map having a plurality of color feature entries. In more detail, the hue-based color segment unit 40 classifies each pixel in the block by hue information and groups the pixels having similar hue. The number of groups indicates how many objects are in the block. The value of color feature entry relates to the number of groups in the block. The edge detection unit 42 generates an edge map having a plurality of edge feature entries, wherein the value of each edge feature entry relates to the number of edge pixels in the corresponding block. The edge pixels may be determined by a high pass filter (HPF). The term "edge pixel" is the pixel on edge. The position analysis unit 44 generates an attention map having a plurality of attention feature entries. The position analysis unit 44 may be omitted in another embodiment. The value of color, edge and attention feature entries indicates strength of color, edge and attention feature.

In an embodiment, when the value in one of the color feature entries is higher, the possibility of having different objects in the corresponding block is higher. The disparity entry of the corresponding block is more reliable, if the color feature entry is higher. When the value in one of the edge feature entries is higher, the number of edges in the corresponding block is greater. The disparity entry of the corresponding block is more reliable, if the edge feature entry is higher. And when the value in one of the attention feature entries is higher, the position of the corresponding block makes it easier to be perceived by human. For example, the blocks in the middle part of the image tend to have higher values since they are easier to be perceived by human than the blocks on the edges of the image.

It is noted that there are merely three types of features in the above embodiment. In other embodiments, other kinds of features may be taken into consideration as well.

Figure 5:
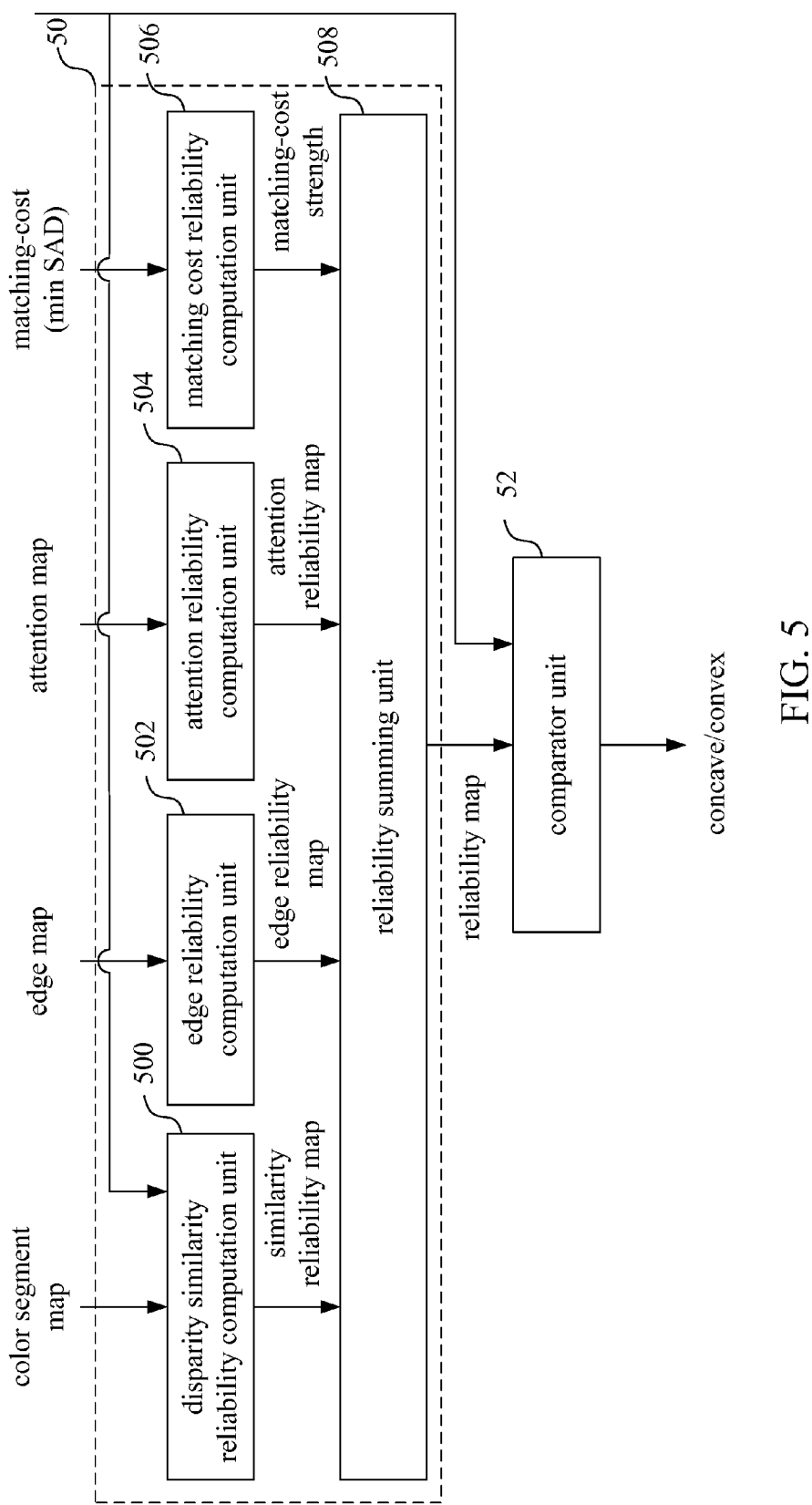
FIG. 5 is a detailed block diagram of a estimation module in an embodiment of the present disclosure.

FIG. 5 is a detailed block diagram of the estimation module 16 in an embodiment of the present disclosure. In the present embodiment, the estimation module 16 comprises a reliability computation unit 50 and a comparator unit 52, in which the reliability computation unit 50 comprises a disparity similarity reliability computation unit 500, an edge reliability computation unit 502, an attention reliability computation unit 504, a matching-cost reliability computation unit 506 and a reliability summing unit 508. The disparity similarity reliability computation unit 500, the edge reliability computation unit 502, the attention reliability computation unit 504, the matching-cost reliability computation unit 506 convert the color segment map, edge map, attention map and the matching-costs of the blocks into corresponding reliability maps respectively.

The disparity similarity reliability computation unit 500 generates a similarity reliability map according to the color segment map from the hue-based color segment unit 40 depicted in FIG. 4 and the disparity map from the computation module 12 depicted in FIG. 1. The disparity similarity reliability computation unit 500 compares the disparity entry of one specific block and the disparity entries of the blocks neighboring to the specific block when the color of these blocks are about the same (or in the same predetermined color range) to verify reliability of the disparity entries and further normalize the disparity entries. The similarity reliability map thus has a plurality of similarity reliability entries respectively corresponding to the color feature entries of color segment map. When the disparity entry of the specific block and the disparity entries of the blocks neighboring to the specific block having the same color are similar, the similarity reliability entry of the specific block is higher.

The edge reliability computation unit 502 generates an edge reliability map according to the edge map from the edge detection unit 42 depicted in FIG. 4, wherein the edge reliability map has a plurality of edge reliability entries respectively corresponding to the edge feature entries of edge map. In more detail, the edge reliability entries are proportional to the edge feature entries. For example, the edge reliability entries are generated by normalizing the edge feature entries to 0~2.

The attention reliability computation unit 504 generates an attention reliability map by normalizing the attention map from the position analysis unit 44 depicted in FIG. 4, wherein the attention map has a plurality of attention reliability entries respectively corresponding to the blocks.

The matching-cost reliability computation unit 506 generates a matching-cost reliability map according to the matching-costs of the blocks (i.e., the minimal sum of absolute difference of each of the blocks derived from the disparity computation unit 32 of the computation module 12 depicted in FIG. 1), wherein the matching-cost reliability map has a plurality of matching-cost reliability entries respectively corresponding to the blocks.

Hence, the reliability summing unit 508 is able to compute a reliability map comprising a feature reliability of each of the blocks based on the plurality of feature maps. In other words, the feature reliability of each of the blocks is the sum of the similarity reliability entry, the edge reliability entry, the attention reliability entry and the matching-cost reliability entry of each of the blocks.

The comparator unit 52 receives the reliability map and filters out a plurality of unqualified blocks according to a comparison result between the feature reliability of each of the blocks and at least one reliability threshold to generate a plurality of candidate blocks. When the feature reliability of a specific block is not high enough, the specific block is discarded since the chance that it is the true concave block or the true convex block is relatively low.

Accordingly, the comparator unit 52 further determines the disparity entries of the candidate blocks by referring to the disparity map, and then determines the concave block and the convex block according to a maximum disparity entry and a minimum disparity entry of the candidate blocks. In an embodiment, the concave block corresponds to the maximum disparity entry of the disparity map and the convex block corresponds to the minimum disparity entry of the disparity map.

The stereo matching device 1 in the present disclosure is a reliability-based scheme that is able to detect true concave or convex without using high complexity stereo matching. By extracting the feature information of the blocks, the features of the blocks can be computed easily, in which the cost of the feature-extraction is low. The feature reliability of the blocks can be further derived from the feature strength to select the candidate blocks that have higher feature reliability. Accordingly, the convex and the convex blocks can be selected from the candidate blocks quickly.

Figure 6:
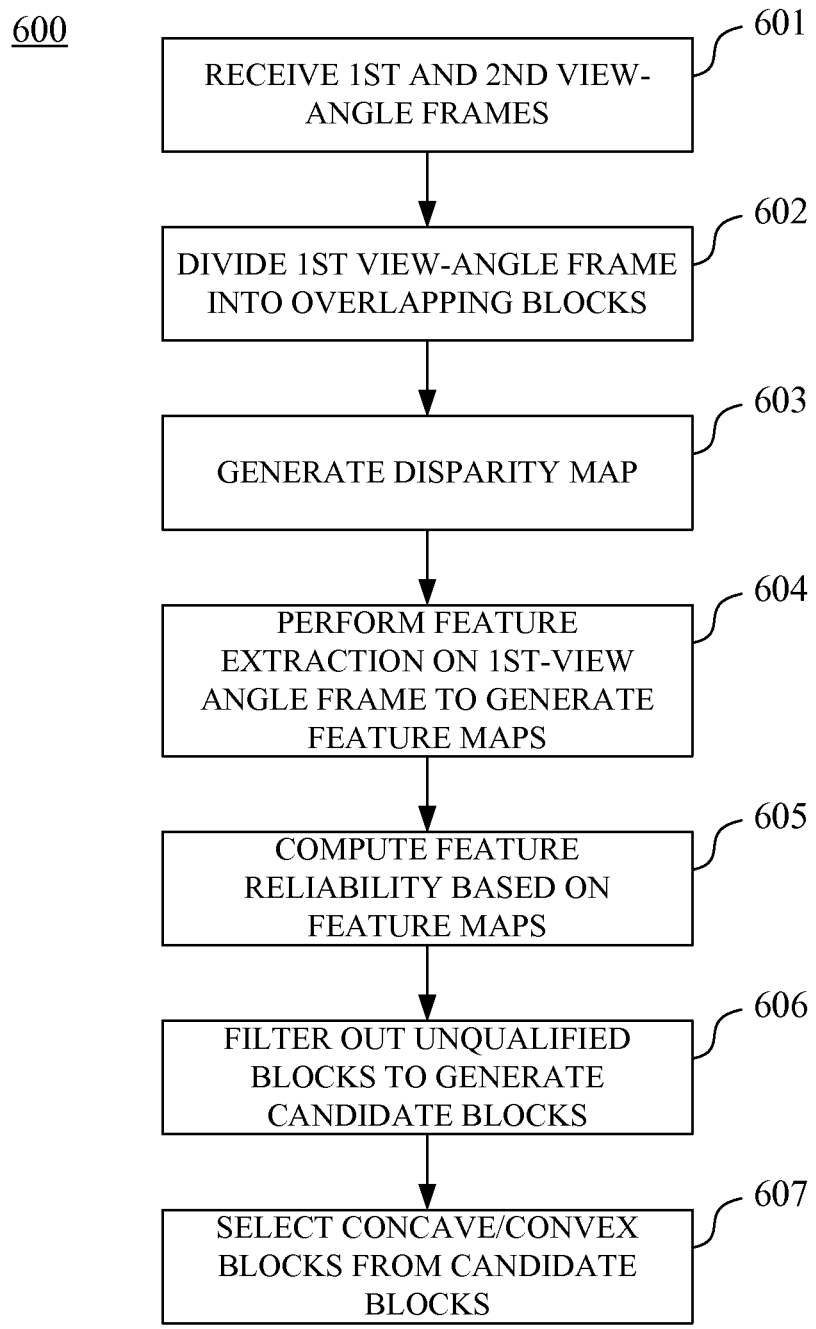
FIG. 6 is a flow chart of a stereo matching method in an embodiment of the present disclosure.

FIG. 6 is a flow chart of a stereo matching method 600 in an embodiment of the present disclosure. The stereo matching method 600 can be used in the stereo matching device 1 depicted in FIG. 1. The stereo matching method 600 comprises the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 601, the receiving module 10 receives a first view-angle frame 11 and a second view-angle frame 13. The receiving module further divides the first view-angle frame 11 into a plurality of blocks in step 602. In step 603, the computation module 12 generates a disparity map having a plurality of disparity entries respectively corresponding to the plurality of the blocks according to the first view-angle frame 11 and the second view-angle frame 13.

In step 604, the feature extraction module 14 performs a feature extraction process on each of the blocks to generate a plurality of feature maps, wherein each of the feature maps has a plurality of feature entries respectively corresponding to the blocks.

In step 605, the reliability computation unit 50 of the estimation module 16 computes a feature reliability of each of the blocks based on the plurality of the feature maps, wherein the feature reliability is a sum of the feature strength of the features of each of the blocks.

In step 606, the comparator unit 52 of the estimation module 16 filters out a plurality of unqualified blocks according to a comparison result between the feature reliability of each of the blocks and at least one reliability threshold to generate a plurality of candidate blocks. The concave block and the convex block are further determined by the comparator unit 52 according to a maximum disparity entry and a minimum disparity entry of the candidate blocks in step 607. The disparity entry of the candidate blocks may be determined by referring to the disparity map generated in step 603.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A stereo matching method used in a stereo matching device of a stereoscopic display system for determining a concave block and a convex block, wherein the stereo matching method comprises:
receiving a first view-angle frame and a second view-angle frame;
dividing the first view-angle frame into a plurality of blocks, wherein each of the blocks comprises a plurality of pixels;
generating a disparity map having a plurality of disparity entries respectively corresponding to the plurality of the blocks according to the first view-angle frame and the second view-angle frame;
performing a feature extraction process on each of the blocks to generate a plurality of feature maps, wherein each of the feature maps has a plurality of feature entries respectively corresponding to the blocks;
computing a feature reliability of each of the blocks based on the plurality of the feature maps, wherein the feature reliability is a sum of the feature entries of the feature maps;
filtering out a plurality of unqualified blocks according to a comparison result between the feature reliability of each of the blocks and at least one reliability threshold to generate a plurality of candidate blocks; and
determining the concave block and the convex block according to a maximum disparity entry and a minimum disparity entry the candidate blocks, wherein the concave block corresponds to the maximum disparity entry of the disparity map and the convex block corresponds to the minimum disparity entry of the disparity map.

2. The stereo matching method of claim 1, wherein the step of performing the feature extraction process further comprises:
generating a color segment map having a plurality of color feature entries; and
generating an edge map having a plurality of edge feature entries.

3. The stereo matching method of claim 2, wherein the step of performing the feature extraction process further comprises:
generating an attention map having a plurality of attention feature entries.

4. The stereo matching method of claim 2, wherein step of computing the feature reliability further comprises:

generating a similarity reliability map according to the color segment map and the disparity map, wherein the disparity similarity reliability map has a plurality of similarity reliability entries each corresponding to a similarity strength of each of the blocks;

generating an edge reliability map according to the edge map, wherein the edge reliability map has a plurality of edge reliability entries each corresponding to an edge strength of each of the blocks;

generating a matching-cost reliability map according to the minimal sum of absolute difference of each of the blocks, wherein the matching-cost reliability map has a plurality of matching-cost reliability entries each corresponding to a matching-cost strength of each of the blocks; and generating the feature reliability of each of the blocks by summing the plurality of similarity reliability entries, the plurality of edge reliability entries and the plurality of matching-cost reliability entries of each of the blocks.

5. The stereo matching method of claim 4, wherein step of computing the feature reliability further comprises:

generating an attention reliability map according to the attention map, wherein the attention map has a plurality of attention reliability entries each corresponding to an attention strength of each of the blocks, wherein the feature reliability of each of the blocks is generated by summing the plurality of similarity reliability entries, the plurality of edge reliability entries, the plurality of matching-cost reliability entries and the plurality of attention reliability entries of each of the blocks.

6. The stereo matching method of claim 1, wherein the step of generating the disparity map further comprises computing a minimal sum of absolute difference between each of the blocks of the first view-angle frame and each of a plurality of corresponding blocks of the second view-angle frame.

7. The stereo matching method of claim 1, wherein the step of receiving the first view-angle frame and the second view-angle frame further comprises performing a low pass filtering process and a down sampling process on the first view-angle frame and the second view-angle frame respectively.

\* \* \* \* \*